Oct. 7, 1969        E. G. SIEVERKROPP        3,470,988
        HYDRAULICALLY OPERATED FRICTION CLUTCH OF
            THE DUAL ACTUATING CHAMBER TYPE
                 Filed Jan. 19, 1968
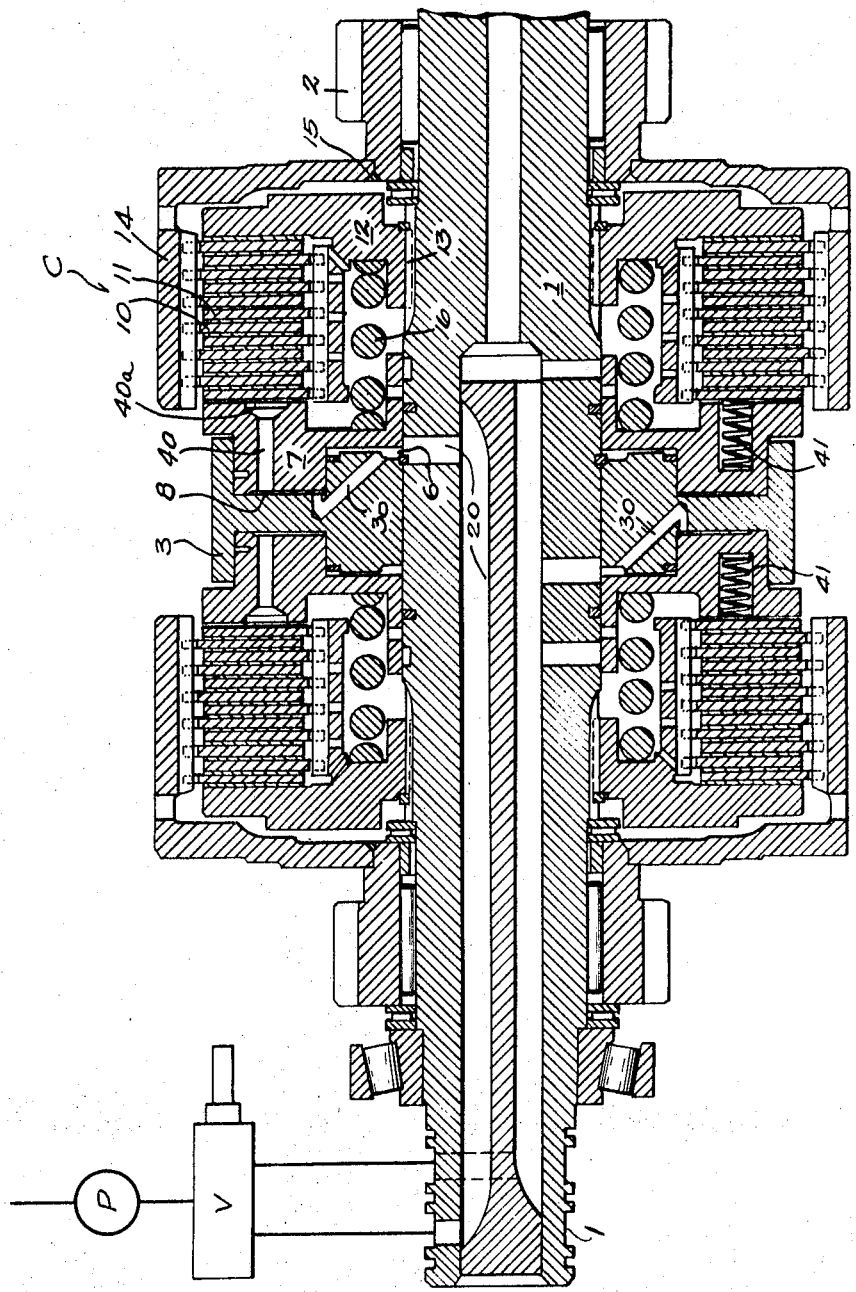
INVENTOR:
EARL G. SIEVERKROPP
BY: James E. Nilles
                ATTORNEY

United States Patent Office 3,470,988
Patented Oct. 7, 1969

3,470,988
HYDRAULICALLY OPERATED FRICTION CLUTCH OF THE DUAL ACTUATING CHAMBER TYPE
Earl G. Sieverkropp, Racine, Wis., assignor to Twin Disc, Incorporated, Racine, Wis., a corporation of Wisconsin
Filed Jan. 19, 1968, Ser. No. 699,142
Int. Cl. F16d 21/08, 25/062
U.S. Cl. 192—87.15                                 3 Claims

ABSTRACT OF THE DISCLOSURE

A hydraulically actuated friction clutch of the type having a "stepped" piston and cylinder which define dual actuating chambers. One of the chambers is smaller and acts first to move the piston toward the plate engaging position. A fluid feed passage is provided between the two chambers to provide sequential pressurization thereof; a bleed passage in the piston permits entry of air when the larger chamber is filling to prevent a formation of vacuum therein and also to provide an amount of air so that after clamp up commences a cushioning effect is provided; the bleed passage subsequently permits rapid fluid dumping when the clutch is to be disengaged.

Field of the invention

This invention pertains to hydraulically actuated clutches of the type having sequentially pressurized, dual actuating chambers for each clutch.

Description of the prior art

The present invention is in the nature of an improvement over the clutches shown in the U.S. Patents 3,262,-531 issued July 26, 1966, to Black et al.; 3,243,026 issued Mar. 29, 1966, to Snoy et al.; and 3,245,507 issued Apr. 12, 1966, to Hilpert. The invention eliminates considerable valving found in the prior art and permits entry of air into the main actuating chamber when the latter is filling with actuating fluid thereby providing a cushioning effect when clutch clamp up occurs, and also permits rapid dumping of the main chamber when the clutch is to be disengaged.

Summary of the invention

The present invention provides an improved hydraulically actuated friction clutch of the type having sequentially pressurized, dual actuating chambers, one of which is smaller and pressurized first to commence piston movement. As pressure is building up in this first chamber, fluid is then also being directed from this first chamber through a controlled size feed passage in the reaction cylinder member and into the larger main actuating chamber. A bleed passage in the piston permits entry of air into the main cylinder when the latter is being filled with fluid thus providing a cushioning effect after plate clamp up action commences; the bleed passage is shut by the adjacent clutch plate during such clutch clamp up; and the bleed passage permits fast dumping of fluid from the chamber when the clutch is disengaged.

The clutch provided by the present invention assures immediate and rapid movement of the piston in the clutch engaging direction because of the small capacity of the first, smaller chamber; the fluid feed passage between the chambers is of such restricted size that it restricts entry of fluid into the large chamber and thus air is also permitted to rush into the larger chamber through a bleed passage in the piston while the large chamber is filling, thereby preventing vacuum formation in the large chamber and also providing a cushioning effect due to the compressibility of this trapped air; when the clutch is to be engaged, the same bleed passage in the piston permits immediate and rapid dumping of the main chamber.

Brief description of the drawing

The drawing is a longitudinal cross section of a dual clutch embodying the present invention.

Description of the preferred embodiment

The invention will be shown and described in connection with a dual clutch arrangement, but it should be understood that the invention is applicable to either a single or dual clutch arrangement. Inasmuch as the two clutches shown in the drawings are similar, only one will be described.

Power may be transmitted to the clutch through the drive shaft 1 and is then taken from the clutch from the output gear 2. However, the direction of power flow is not material to the present invention. A reaction cylinder member 3 is fixed to the shaft 1, for example, by being pressed fit thereon. This cylinder member defines a first, smaller actuating chamber 6 together with the "stepped piston" 7, and it also defines a larger, main actuating chamber 8 together with the piston 7. Generally, as these chambers are pressurized, the piston 7 is forced to move to the right (as viewed in the drawings) thereby engaging the clutch plates 10 and 11 which are interleaved respectively to the hub 12 secured by the splined means 13 to the shaft 1, and to the drum member 14 which is welded as at 15 to the output gear 2. A relatively large spring 16 acts between the hub 12 and piston 7 to urge the latter to the clutch disengaged position.

Suitable snap rings and oil seals as shown are provided between the various parts in the conventional manner.

Fluid is directed to and from chamber 6 through passage means 20 from an external source such as a fluid pump P, and through a conventional selector valve V.

A fluid feed passage 30 is formed in the cylinder member 3 and places the first, smaller chamber 6 in fluid communication with the larger main actuating chamber 8. The size of this passage 30 is restricted so as to limit and control the fluid flow from the first chamber 6 to the radially outward, larger chamber 8. Thus, depending on the size of feed passage 30, the speed of the clutch engagement may be varied.

It should be noted that the size of passage 30 is such that there is some restriction of flow between the chambers, so that the bleed passage 40 in the piston 7 can function properly, as will now appear.

The bleed passage 40 extends through the piston and any number of these passages may be provided in the piston, for example, one or two preferably. Passage 40 is provided with an enlarged end, by means of counterbore 40a, to insure adequate entry of air as will appear. The total cross sectional area of passage 40 in a piston is preferably larger than the total cross sectional area of passage 30 in the cylinder.

In operation, when it is desired to actuate the clutch C, fluid pressure is admitted through passage 20 and into chamber 6. This causes initial movement of the piston 7 to the right (as viewed in the drawing), that is, to the clutch engaged position. As the pressure in chamber 6 rises, due to the resistance of spring 16, fluid flows through passage 30 at a controlled rate and into large chamber 8. The passage 30 is of such size that during fluid flow to chamber 8, the demand for fluid to fill chamber 8 cannot be met due to the movement of piston 7 which would tend to create a negative pressure in chamber 8. However, air rushes through passage 40 from the area of the clutch plates 10 and 11, and into chamber 8, because the first clutch plate of the pack has not sealed sufficiently against the passage 40, and counterbore 40a assures a good air entry. Therefore, this air which rushes into chamber 8 prevents formation of this negative pressure or vacuum in the large chamber 8. The trapped air provides a built-in rate of pressure rise control, resulting in less shift shock. The in rushing air prevents a negative or sub-atmospheric pressure in the large chamber, permitting the smaller chamber to be particularly effective in rapidly moving the piston to the clutch apply position.

The spring 16 normally biases the piston to the left and into the dumping position. Spring 41 pushes the plate adjacent the piston away from the piston and air rushes through passage 40 and into the large chamber when the clutch is being engaged, and permits oil to rush out passage 40 when the clutch is being released. As the piston moves to the right, the pressure of springs 16 and 41 are then overcome and passage 40 is shut by the first clutch plate, the plate acting as a valve, and full clamp up of the plates occurs. The trapped air within chamber 8 provides a cushioning effect due to the fact that the air is somewhat compressible as compared to the oil or other fluid.

When it is desired to release the clutch, the fluid pressure supply is cut off from passage 20, that is, passage 20 is vented, by means of the selector valve V, and the spring 16 then immediately pushes the piston to the left and away from the clutch plates, causing the passage 40 to open. This permits the immediate dumping of the mixture of air and oil in chamber 8 into the area of the clutch plates. Particularly fast action of the clutch is thus assured.

With the present invention, much valving has been eliminated from the prior art devices without sacrificing rapid operation and the desirable cushioning effect.

I claim:

1. A hydraulically actuated friction clutch having a power input element and a power output element with interleaved and diseangageable clutch plates therebetween, hydraulic cylinder and piston means between said elements for releasably clamping said plates together, said means comprising; a cylinder member having a complementary shaped piston slidable relative thereto to define therewith dual actuating chambers which are pressurizable to cause piston movement toward a plate clamping position, one of said chambers being located radially inwardly of the other and constituting a first actuating chamber, fluid supply means for said first chamber, a feed passage means in said cylinder member and placing said chambers in fluid communication with one another whereby fluid is forced into the radially outward chamber after said first actuating chamber reaches a predetermined pressure, a bleed passage in said piston and placing said radially outward chamber in communication with the atmosphere, said plates abuttable against said bleed passage when said clutch is engaged, and spring means urging said piston away from said clutch plates, whereby air can rush into radially outward chamber during preliminary fluid filling thereof to provide a cushioning effect on clutch engagement, and said bleed passage can dump the radially outward chamber when pressure is relieved therefrom.

2. A clutch as defined in claim 1 further characterized in that said first actuating chamber is of smaller volume than said chamber, and said feed passage means in said cylinder restricts fluid flow between said chambers whereby air can rush into said second chamber while the latter is filling.

3. A friction clutch having a power input element and a power output element with interleaved and disengagable clutch plates therebetween, hydraulic cylinder and piston means between said elements for releasably clamping said plates together, said means comprising; a cylinder member having a complementary shaped piston member slidable relative thereto to define therewith dual actuating chambers which are pressurizable to cause piston movement toward plate clamping position, one of said chambers being located radially inwardly of the other and constituting a first actuating chamber, fluid supply means for said first actuating chamber, feed passage means in one of said members and placing said chambers in fluid communication with one another whereby fluid is forced into the radially outward chamber as said first actuating chamber begins to fill, said first actuating chamber being of a smaller volume than said outward chamber, bleed passage means in said piston member and placing the radially outward chamber in communication with the atmosphere, the total cross sectional area of said bleed passage means being larger than the total cross sectional area of said feed passage means, and means automatically closing said bleed passage means when said clutch is engaged, whereby air can rush into the radially outward chamber during preliminary fluid filling thereof to provide a cushioning effect upon clutch engagement, and said bleed passage means can dump the radially outward chamber when said clutch is released.

References Cited

UNITED STATES PATENTS

| 2,632,544 | 3/1953 | Hockert | 192—87 |
| 2,642,844 | 6/1953 | Flinn | 121—38 |
| 2,670,828 | 3/1954 | McFarland | 192—106 XR |
| 3,162,063 | 12/1964 | Konrad | 192—85 XR |
| 3,360,087 | 12/1967 | Hilpert. | |

FOREIGN PATENTS

| 807,875 | 4/1951 | Germany. |

MARTIN P. SCHWADRON, Primary Examiner

L. J. PAYNE, Assistant Examiner

U.S. Cl. X.R.

192—106, 109